US008914722B2

(12) United States Patent
Milton, Jr. et al.

(10) Patent No.: US 8,914,722 B2
(45) Date of Patent: *Dec. 16, 2014

(54) COMPUTER SYSTEM FOR AUTOMATICALLY COMBINING REFERENCE INDICIA TO A COMMON NOUN DIFFERENTIATED BY ADJECTIVES IN A DOCUMENT

(71) Applicants: Harold W. Milton, Jr., Bloomfield Hills, MI (US); Jacob Allen, Utica, MI (US)

(72) Inventors: Harold W. Milton, Jr., Bloomfield Hills, MI (US); Jacob Allen, Utica, MI (US)

(73) Assignee: Harold W. Milton, Jr., Bloomfield Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/015,217

(22) Filed: Aug. 30, 2013

(65) Prior Publication Data
US 2014/0006014 A1 Jan. 2, 2014

Related U.S. Application Data

(63) Continuation of application No. 11/940,618, filed on Nov. 15, 2007, now Pat. No. 8,612,853.

(51) Int. Cl.
*G06F 17/00* (2006.01)
*G06F 17/28* (2006.01)
*G06F 17/24* (2006.01)
*G06F 17/27* (2006.01)

(52) U.S. Cl.
CPC .............. *G06F 17/28* (2013.01); *G06F 17/241* (2013.01); *G06F 17/2745* (2013.01)
USPC .......................................... 715/255; 715/271

(58) Field of Classification Search
CPC ..................................................... G06F 3/0236
USPC .................................. 715/256, 200, 255, 271
See application file for complete search history.

(56) References Cited

U.S. PATENT DOCUMENTS

| | | | | |
|---|---|---|---|---|
| 5,303,150 | A * | 4/1994 | Kameda | 704/9 |
| 5,873,660 | A * | 2/1999 | Walsh et al. | 400/63 |
| 7,756,855 | B2 * | 7/2010 | Ismalon | 707/713 |
| 8,205,149 | B2 * | 6/2012 | Chan et al. | 715/212 |
| 2007/0276649 | A1 * | 11/2007 | Schubert | 704/2 |
| 2008/0263443 | A1 * | 10/2008 | Maxime | 715/271 |

* cited by examiner

*Primary Examiner* — Manglesh M Patel
(74) *Attorney, Agent, or Firm* — Dickinson Wright PLLC

(57) ABSTRACT

A computer system for preparing a document which includes multiple elements having a common noun and being differentiated by a reference indicia with each combination of primary and secondary adjectives by automatically scanning the document for each combination of the primary and secondary adjectives and inserting all of the reference indicia following the common noun in response to a scanning processor detecting the occurrence of the common noun unmodified by an adjective to reference the unmodified common noun with all of the reference indicia for the elements throughout the document without attaching the reference indicia to occurrences of the common noun modified by one of the adjectives.

5 Claims, 8 Drawing Sheets

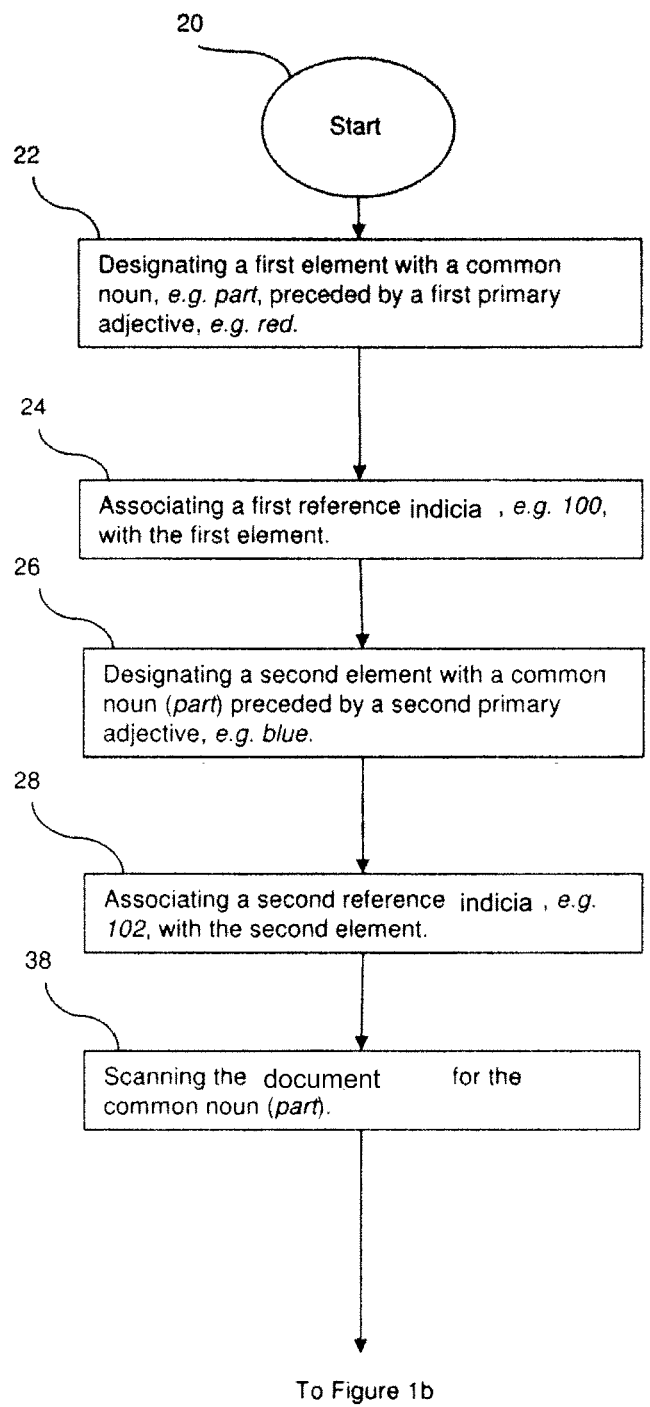

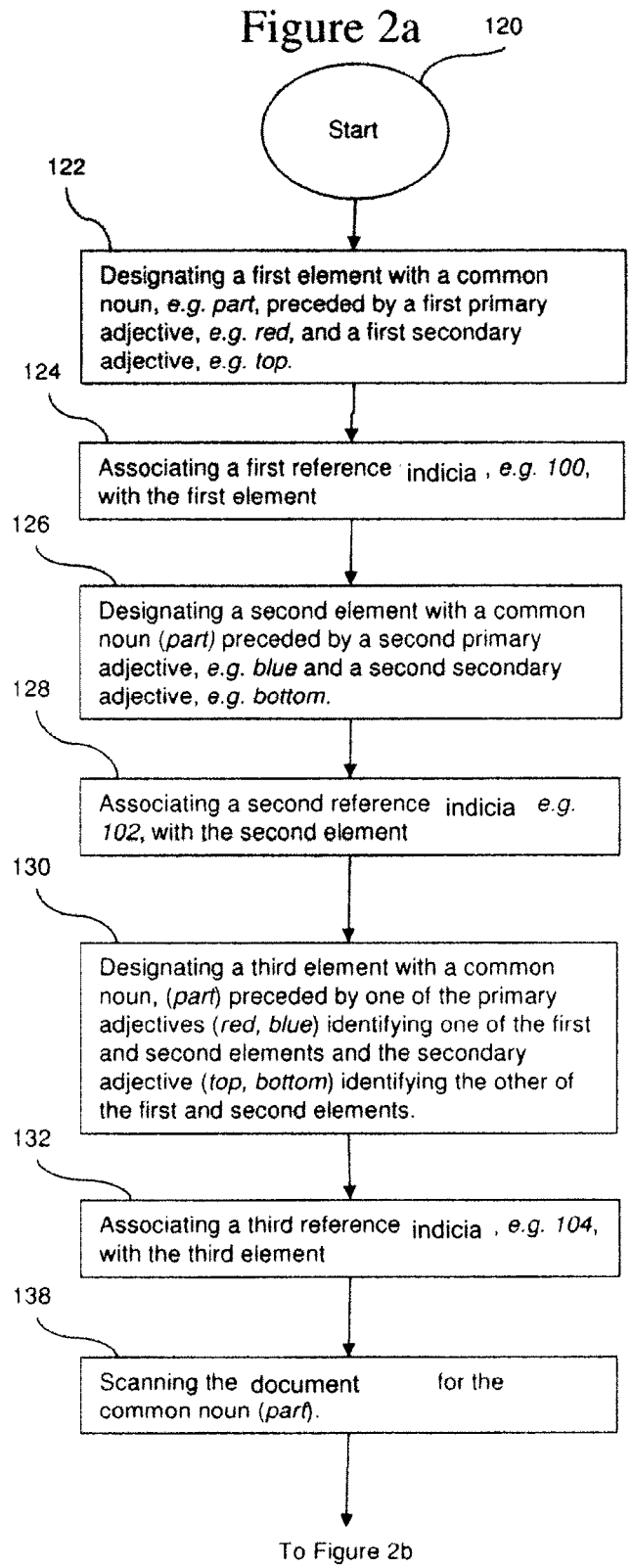

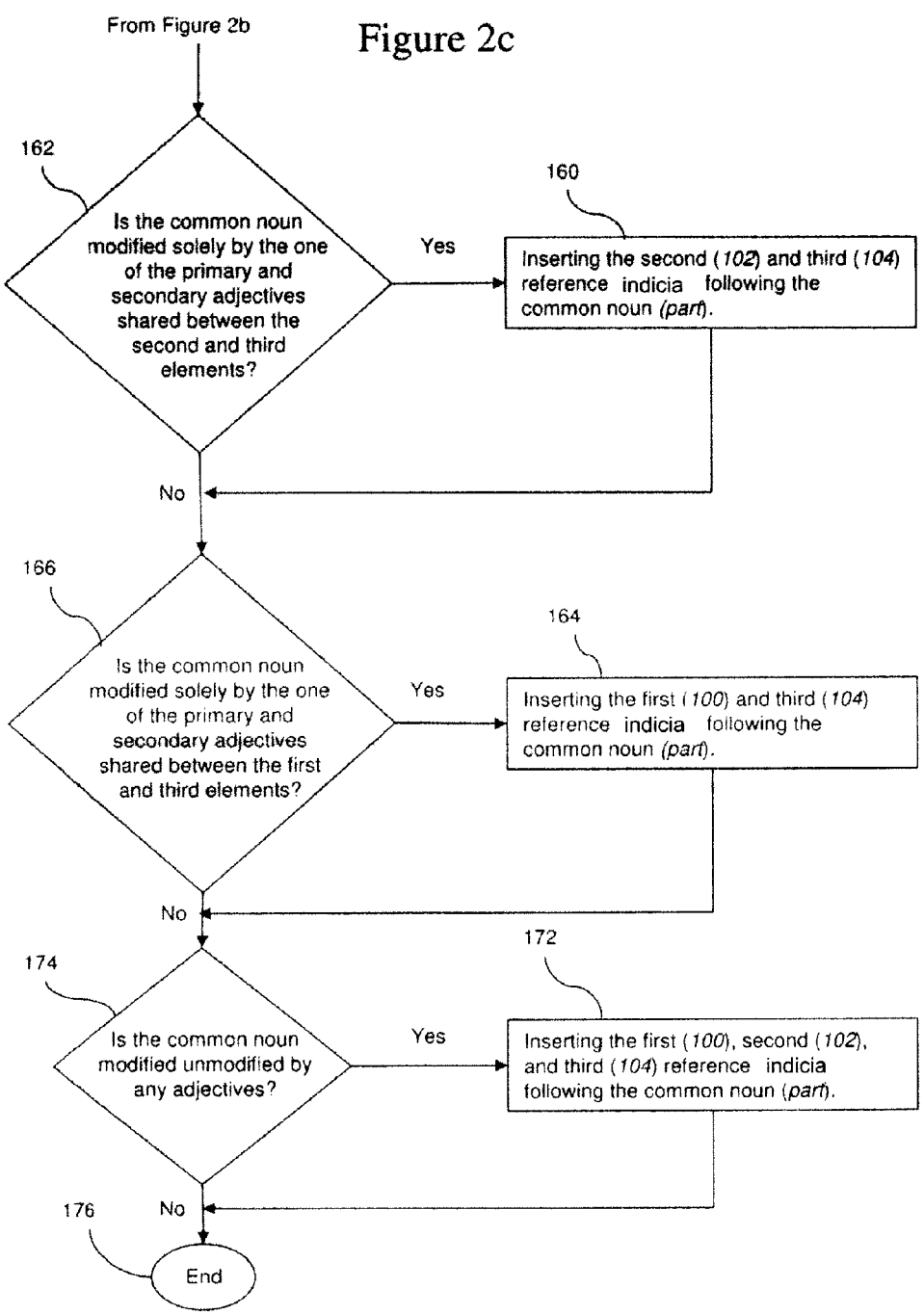

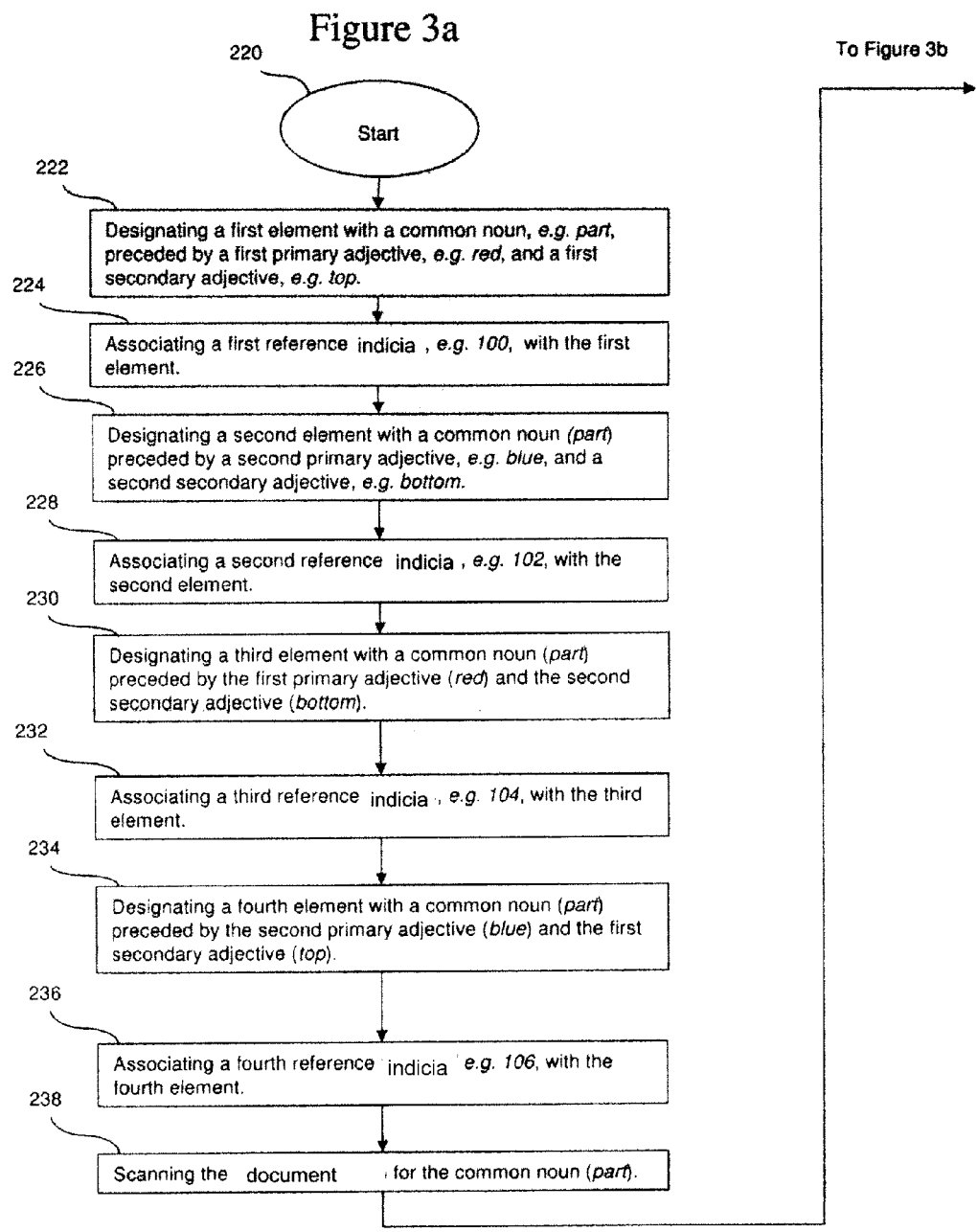

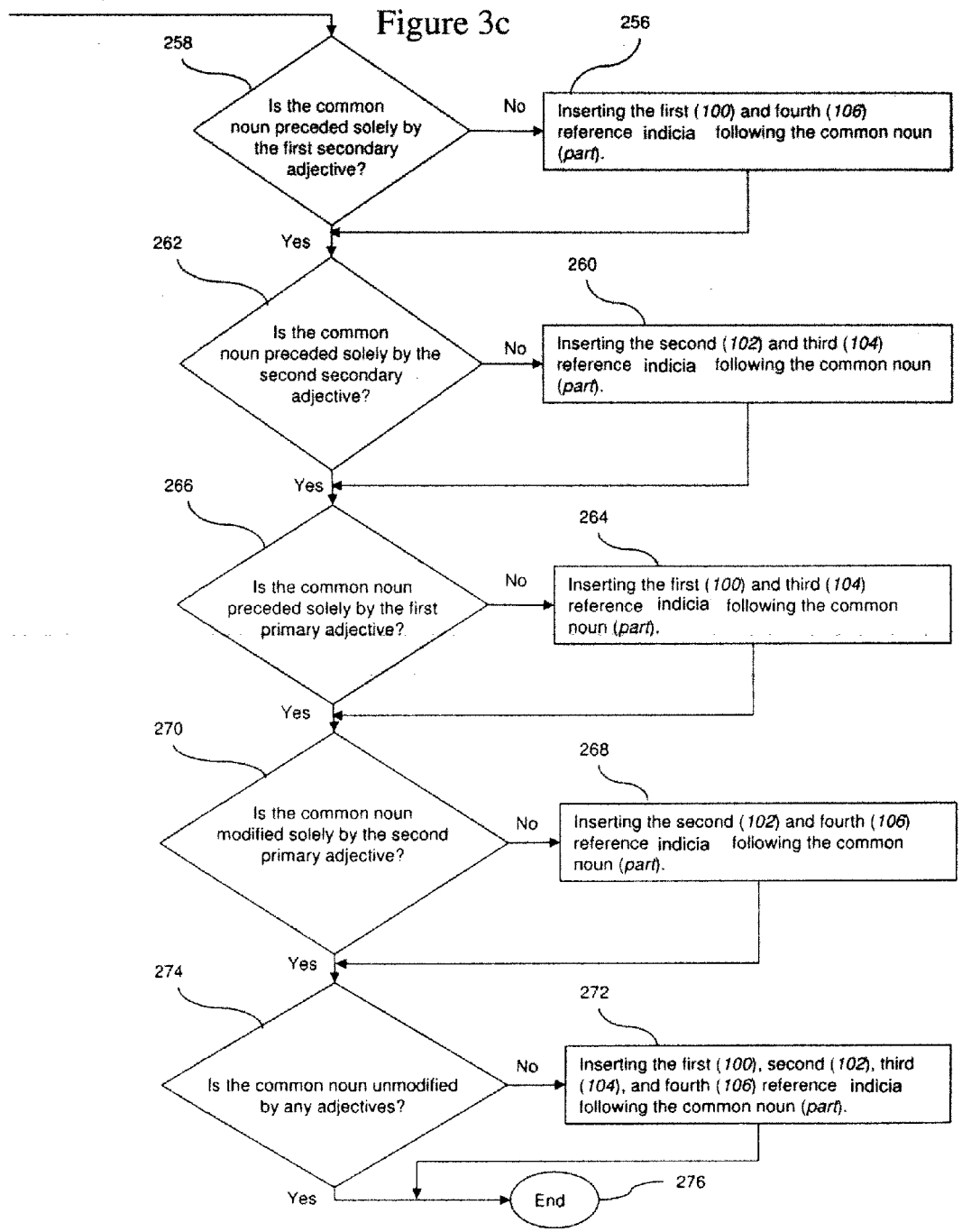

COMPUTER SYSTEM FOR AUTOMATICALLY COMBINING REFERENCE INDICIA TO A COMMON NOUN DIFFERENTIATED BY ADJECTIVES IN A DOCUMENT

CROSS REFERENCE TO RELATED APPLICATION

This application claims priority to U.S. Utility application Ser. No. 11/940,618, filed Nov. 15, 2007.

BACKGROUND OF THE INVENTION

1. Field of the Invention

A method of preparing a document referencing common elements differentially using a computer word processing program.

2. Description of the Prior Art

The method of preparing a document is well known using various word processing programs. Such programs utilized a search and replace function where the document can be searched for a word and automatically replaced with a different word. However, there are instances, particularly in technical or engineering documents, where a common noun may be associated with multiple elements sharing a common noun and that element is further differentiated by different combinations of adjectives.

SUMMARY OF THE INVENTION

The invention provides a method for preparing a document by scanning for different combinations of adjectives modifying a common noun used for multiple elements and automatically inserting first and second reference indicia following the common noun in response to each recitation of the common noun unmodified by an adjective to reference the unmodified common noun with both reference indicia for the first and second elements throughout the document without attaching the multiple reference indicia to occurrences of the common noun modified by one of the adjectives.

The invention also provides a computer system including a common noun processor for automatically inserting the first and second reference indicia following the common noun in response to a scanning processor detecting the common noun unmodified by an adjective to reference the unmodified common noun with both reference indicia for the first and second elements throughout the document without attaching the multiple reference indicia to occurrences of the common noun modified by one of the adjectives.

Advantages of the Invention

The invention brings order to the preparation of a document and increases efficiency in the preparation of documents by automatically recognizing combinations of elements when only a single common noun is recited in the document. It automates part of the preparation of documents, but more importantly, it prevents mistakes by ensuring that each element throughout the document properly referenced.

BRIEF DESCRIPTION OF THE DRAWINGS

Other advantages of the present invention will be readily appreciated, as the same becomes better understood by reference to the following detailed description when considered in connection with the accompanying drawing wherein:

FIGS. 1a and 1b are a flow chart of a first embodiment of the invention;

FIGS. 2a, 2b and 2c are a flow chart of a second embodiment of the invention; and FIGS. 3a, 3b and 3c are a flow chart of a third embodiment of the invention.

DETAILED DESCRIPTION OF THE INVENTION

Referring to the Figures, wherein like numerals indicate corresponding parts throughout the several views, a method of using a computer having a document memory and a processor to prepare a document referencing elements to a drawing and presented in the document with a common noun and further differentially presented with different adjectives identifying the noun in the document is shown in the flow charts indicating the steps used to automatically insert reference indicia to identify elements in associated drawings of a document, e.g., document memory.

Figure 1B:
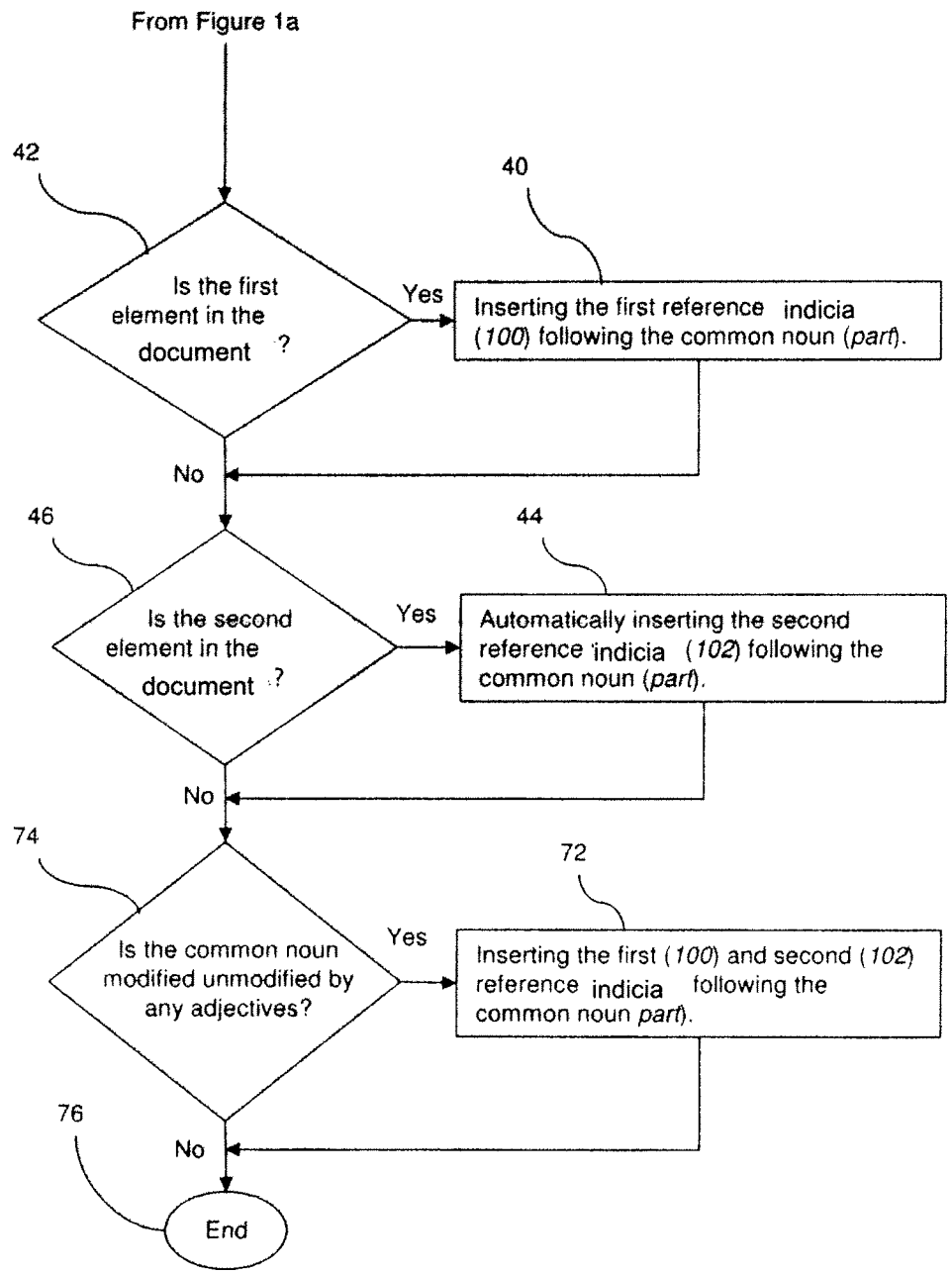

The invention provides a method of preparing a document by using a computer system having memory, a scanning function for searching a document, and document modifying capabilities, e.g., a word processing program which may be manually operated. A first embodiment of the invention, shown in FIG. 1, starts 20 with the step of designating 22, as by manually highlighting, a first element with a common noun, e.g. a part name by a noun, preceded solely by a first primary adjective, e.g. red, and associating 24 a first reference indicia, e.g. an alpha-numeric symbol, letter or numeral 100, with indicia equaling singular and/or plural, with the common noun (part) preceded by the first primary adjective (red).

The method continues with the step of designating 26 a second element with the common noun (part) preceded solely by a second primary adjective, e.g. blue, and associating 28 a second reference indicia, e.g. 102, with the common noun (part) preceded by the second primary adjective (blue). As will become clear as the description of the system proceeds, several of the steps are stored in the document memory of the computer.

The method proceeds by scanning 38 the document for each occurrence of the common noun (part). The method continues by inserting 40 the first reference indicia (100) following the common noun (part) in response to each recitation of the common noun (part) preceded solely by the first primary adjective (red) 42 and inserting 44 the second reference indicia (102) following the common noun (part) in response to each recitation of the common noun (part) preceded solely by the second primary adjective (blue) 46.

The first embodiment is characterized by the computer automatically inserting 72 the first (100) and second (102) reference indicia following the common noun (part) in response to each recitation of the common noun (part) unmodified by an adjective 74 throughout the document without attaching the first (100) and second (102) reference indicia to occurrences of the common noun modified by one of the adjectives. Upon inserting the proper reference indicia following each recitation of the common noun (part), the method ends 76.

Figure 2B:
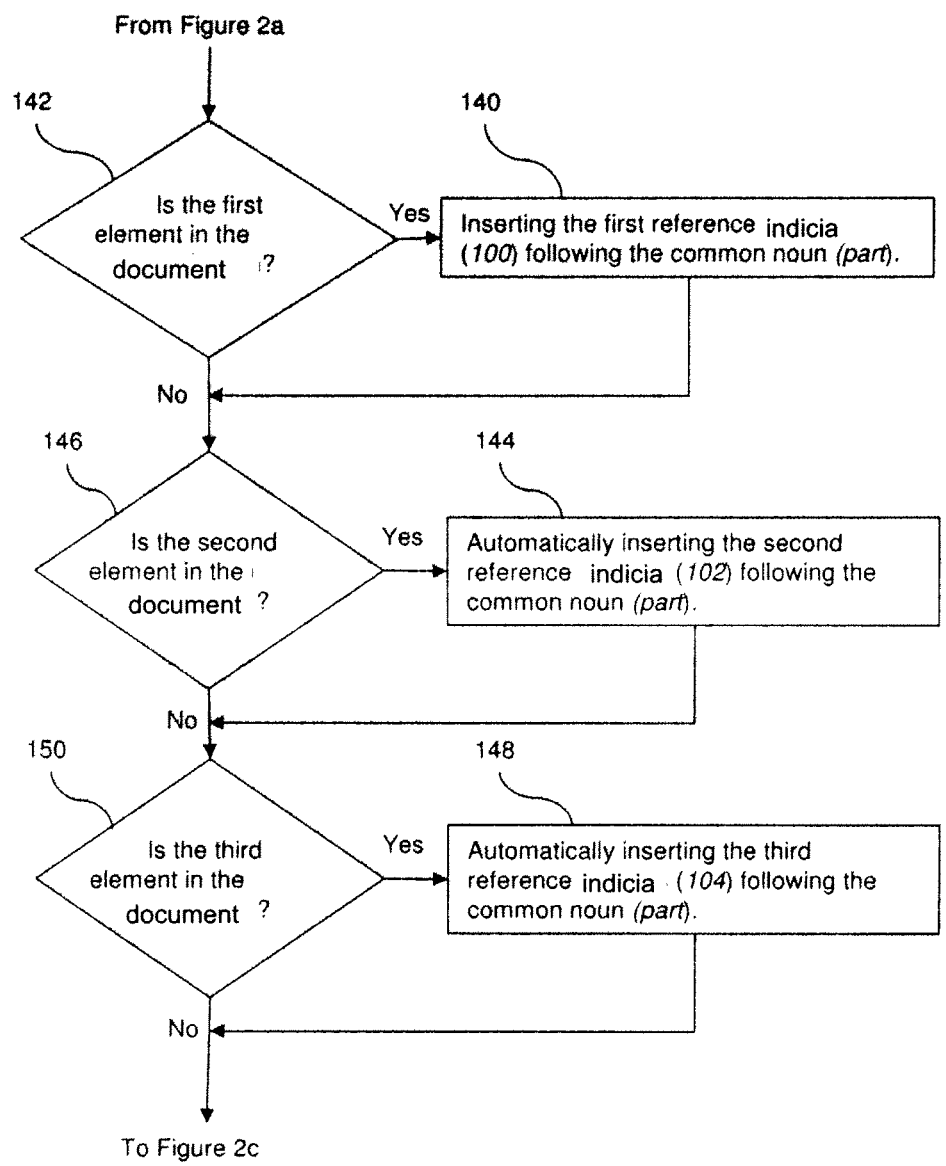

The second embodiment, shown in FIG. 2, starts 120 with the step of designating 122 a first element with a common noun (part) preceded by a first primary adjective (red) and a first secondary adjective, e.g. top, and associating 124 a first reference indicia (100), with the common noun (part) preceded by the first primary adjective (red) and the first secondary adjective (top) to reference the first element, e.g. top red part 100.

The method continues by designating 126 a second element with the common noun (part) preceded by a second primary adjective (blue) and a second secondary adjective, e.g. bottom, and associating 128 a second reference indicia (102) with the common noun (part) preceded by the second primary adjective (blue) and the second secondary adjective (bottom) to reference the second element, e.g. bottom blue part 102.

The method further includes the step of designating 130 a third element with the common noun (part) preceded by a third combination of adjectives including one of the primary adjectives (red, blue) identifying one of the first and second elements combined with the secondary adjective (top, bottom) identifying the other one of the first and second elements and associating 132 a third reference indicia (104) with the third element.

The method proceeds by scanning 138 the document for each occurrence of the common noun (part) for the purpose of inserting the proper reference indicia following each occurrence of the common noun. The method continues by automatically inserting 140 the first reference indicia (100) following the common noun (part) in response to each recitation of the common noun (part) preceded by the first primary adjective (red) and the first secondary adjective (top) throughout the document to reference the first element (top red part) 142.

The method continues by automatically inserting 144 the second reference indicia (102) following the common noun (part) in response to each recitation of the common noun (part) preceded by the second primary adjective (blue) and the second secondary adjective (bottom) throughout the document to reference the second element (bottom blue part) 146.

The method proceeds by automatically inserting 148 the third reference indicia (104) following the common noun (part) in response to each recitation of the common noun (part) preceded by the third combination of adjectives including one of the primary adjectives (red, blue) identifying one of the first and second elements combined with the secondary adjective (top, bottom) identifying the other of the first and second elements 150.

The second embodiment is characterized by the step of automatically inserting 160 the second (102) and third (104) reference indicia following the common noun (part) in response to each recitation of the common noun (part) modified solely by the one of the primary (red, blue) and secondary (top, blue) adjectives shared between the second and third elements 162, and automatically inserting 164 the first (100) and third (104) reference indicia following the common noun (part) in response to each recitation of the common noun (part) modified solely by the one of the primary (red, blue) and secondary (top, bottom) adjectives shared between the first and third elements 166.

The second embodiment continues with the step of automatically inserting 172 the first (100), second (102), and third (104) reference indicia following the common noun (part) in response to each recitation of the common noun (part) unmodified by an adjective 174 throughout the document without attaching the first (100) and second (102) and third (104) reference indicia to occurrences of the common noun modified by one of the adjectives. Upon inserting the proper reference indicia following each recitation of the common noun (part), the method ends 176.

Figure 3B:
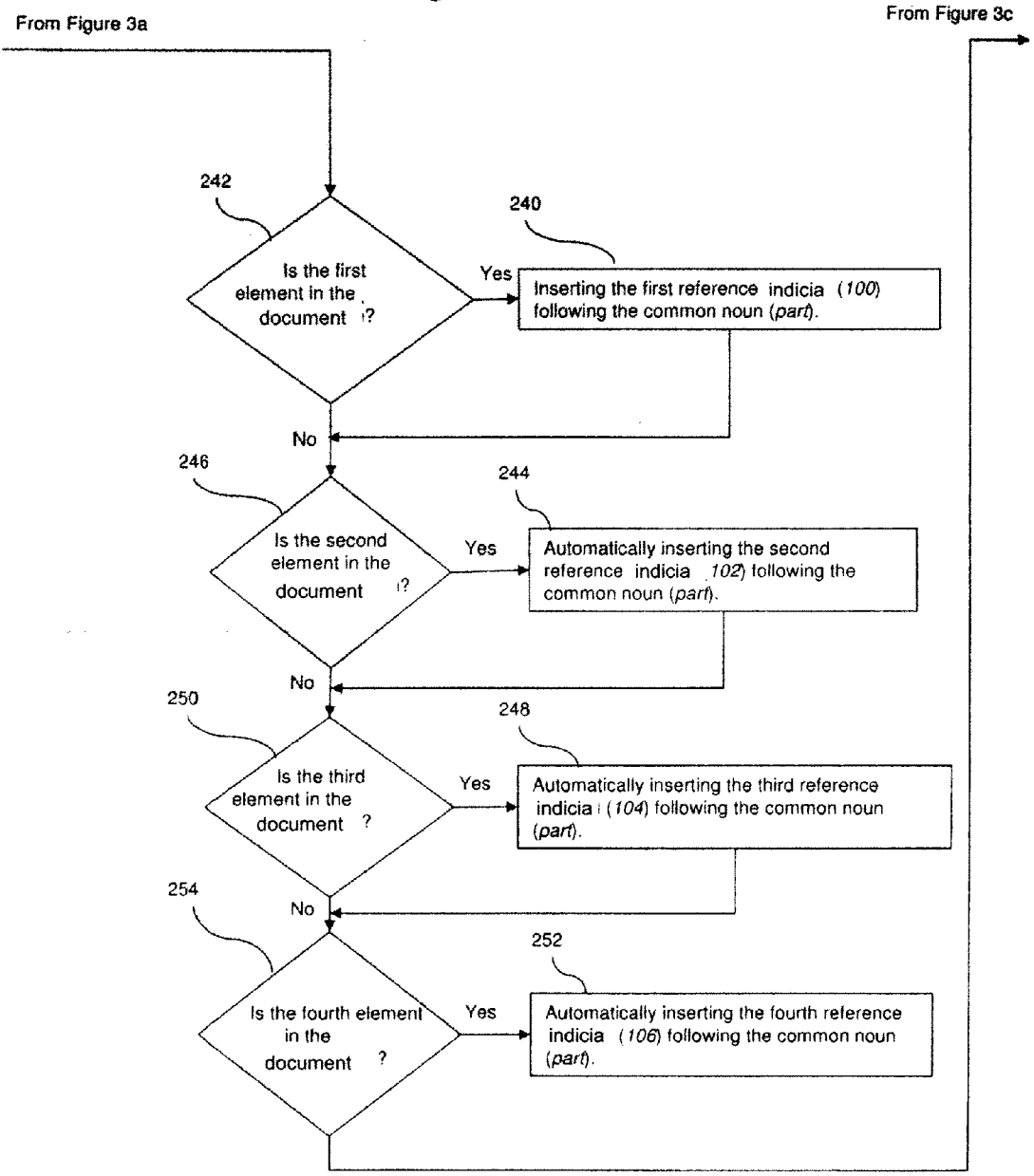

The third embodiment, shown in FIG. 3, starts 220 with the step of designating 222 a first element with a common noun (part) preceded by a first primary adjective (red) and a first secondary adjective (top) and associating 224 a first reference indicia (100), with the common noun (part) preceded by the first primary adjective (red) and the first secondary adjective (top) to reference the first element, e.g. top red part 100.

The method continues by designating 226 a second element with the common noun (part) preceded by a second primary adjective (blue) and a second secondary adjective (bottom) and associating 228 a second reference indicia (102) with the common noun (part) preceded by the second primary adjective (blue) and the second secondary adjective (bottom) to reference the second element, e.g. bottom blue part 102.

The method continues by designating 230 a third element with the common noun (part) preceded by the first primary adjective (red) and the second secondary adjective (bottom) and associating 232 a third reference indicia (104) with the common noun (part) preceded by the first primary adjective (red) and the second secondary adjective (bottom) to reference the third element, e.g. bottom red part 104.

The method continues by designating 234 a fourth element with the common noun (part) preceded by the second primary adjective (blue) and the first secondary adjective (top) and associating 236 a fourth reference indicia, e.g. 106, with the common noun (part) preceded by the second primary adjective (blue) and the first secondary adjective (top) to reference the fourth element, e.g. top blue part 106.

The method proceeds by scanning 238 the document for each occurrence of the common noun (part). The method continues by automatically inserting 240 the first reference indicia (100) following the common noun (part) in response to each recitation of the common noun (part) preceded by the first primary adjective (red) and the first secondary adjective (top) throughout the document to reference the first element (top red part) 242.

The method continues by automatically inserting 244 the second reference indicia (102) following the common noun (part) in response to each recitation of the common noun (part) preceded by the second primary adjective (blue) and the second secondary adjective (bottom) throughout the document to reference the second element (bottom blue part) 246.

The method continues by automatically inserting 248 the third reference indicia (104) following the common noun (part) in response to each recitation of the common noun (part) preceded by the first primary adjective (red) and the second secondary adjective (bottom) throughout the document to reference the third element (bottom red part) 250.

The method continues by automatically inserting 252 the fourth reference indicia (106) following the common noun (part) in response to each recitation of the common noun (part) preceded by the second primary adjective (blue) and the first secondary adjective (top) throughout the document to reference the fourth element (top blue part) 254.

The fourth embodiment is characterized by inserting multiple reference indicia following the common noun (part) where the common noun (part) is preceded by a single modifying adjective or is unmodified by an adjective. The method continues by automatically inserting 256 the first (100) and fourth (106) reference indicia following the common noun (part) in response to each recitation of the common noun (part) modified solely by the first secondary adjective (top) 258 throughout the document to reference the first (top red part) and fourth (top blue part) elements.

The method continues by automatically inserting 260 the second (102) and third (104) reference indicia following the common noun (part) in response to each recitation of the common noun (part) modified solely by the second secondary adjective (bottom) 262 throughout the document to reference the second (bottom blue part) and third (bottom red part) elements.

The method continues by automatically inserting 264 the first (100) and third (104) reference indicia following the common noun (part) in response to each recitation of the common noun (part) modified solely by the first primary adjective (red) 266 throughout the document to reference the first (top red part) and third (bottom red part) elements.

The method continues by automatically inserting 268 the second (102) and fourth (106) reference indicia following the common noun (part) in response to each recitation of the common noun (part) modified solely by the second primary adjective (blue) 270 throughout the document to reference the second (bottom blue part) and fourth (top blue part) elements.

The method further proceeds by automatically inserting 272 the first (100), second (102), third (104), and fourth (106) reference indicia following the common noun (part) in response to each recitation of the common noun (part) unmodified by an adjective 274 throughout the claims section and the description section and the abstract section of the document to reference the first (top red part), second (bottom blue part), third (bottom red part), and fourth (top blue part) elements without attaching the first (100) and second (102) and third (104) and fourth (106) reference indicia to occurrences of the common noun modified by one of the adjectives. Upon inserting the proper reference indicia following each recitation of the common noun (part), the method ends 276.

Any number of adjectives may be used to modify a common noun and define an element. The invention is meant to include any number of elements and any number of different adjectives, the exemplary elements include two or fewer modifying elements for clarity purposes.

The invention also includes a computer system for preparing a document which includes an application document memory.

A first embodiment of the computer system includes a first element memory for storing 22 a first element designated by a common noun (part) preceded solely by a first primary adjective (red) and for storing 24 a first reference indicia (100) associated with the first element.

The first embodiment of the computer system also includes a second element memory for storing 26 a second element designated by the common noun (part) preceded solely by a second primary adjective (blue) and for storing 28 a second reference indicia (102) associated with the second element.

The computer system is characterized by a scanning processor for scanning 38 the document memory for each occurrence of the common noun (part).

The first embodiment of the computer system includes processors for inserting the proper reference indicia into the document memory in response to each occurrence of a single element in the absence of the other elements throughout the document. The system includes a first element processor for automatically inserting 40 the first reference indicia (100) following the common noun (part) in response to the scanning processor detecting the occurrence of the common noun (part) preceded solely by the first primary adjective (red) 42. The system further includes a second element processor for automatically inserting 44 the second reference indicia (102) following the common noun (part) in response to the scanning processor detecting the occurrence of the common noun (part) preceded solely by the second primary adjective (blue) 46.

The first embodiment of the computer system includes a common noun processor for automatically inserting 72 the first (100) and second (102) reference indicia following the common noun (part) in response to the scanning processor detecting the occurrence of the common noun (part) unmodified by an adjective 74 without attaching the first (100) and second (102) reference indicia to occurrences of the common noun modified by one of the adjectives.

A second embodiment of the computer system includes a first element memory for storing 122 a first element designated by a common noun (part) preceded by a first primary adjective (red) and a first secondary adjective (top) and for storing 124 a first reference indicia (100) associated with the first element.

The second embodiment of the computer system also includes a second element memory for storing 126 a second element designated by the common noun (part) preceded by a second primary adjective (blue) and a second secondary adjective (bottom) and for storing 128 a second reference indicia (102) associated with the second element.

The second embodiment of the computer system also includes a third element memory for storing 130 a third element with the common noun (part) preceded by a third combination of adjectives including one of the primary adjectives (red, blue) identifying one of the first and second elements combined with the secondary adjective (top, bottom) identifying the other one of the first and second elements and for storing 132 a third reference indicia (104) associated with the third element.

The second embodiment of the computer system is characterized by a scanning processor for scanning 138 the document memory for each occurrence of the common noun (part).

The second embodiment of the computer system includes processors for inserting the proper reference indicia into the document memory in response to each occurrence of a single element in the absence of the other elements. The system includes a first element processor for automatically inserting 140 the first reference indicia (100) following the common noun (part) in response to the scanning processor detecting the occurrence of the common noun (part) preceded by the first primary adjective (red) and the first secondary adjective (top) 142. The system further includes a second element processor for automatically inserting 144 the second reference indicia (102) following the common noun (part) in response to the scanning processor detecting the occurrence of the common noun (part) preceded by the second primary adjective (blue) and the second secondary adjective (bottom) 146. The system further includes a third element processor for automatically inserting 148 the third reference indicia (104) following the common noun (part) in response to the scanning processor detecting the occurrence of the common noun (part) preceded by the third combination of adjectives including one of the primary adjectives (red, blue) identifying one of the first and second elements combined with the secondary adjective identifying the other of the first and second elements 150.

The second embodiment of the computer system further includes processors for inserting more than one reference indicia when the common noun (part) is modified solely by a single adjective. The system includes a third element secondary adjective processor for automatically inserting the third reference indicia (104) and the one of the first (100) and second (102) reference indicia having the same secondary adjective as the third element in response to the scanning processor detecting the occurrence of the common noun (part) preceded solely by the secondary adjective of the third element. The system also includes a third element primary adjective processor for automatically inserting the third reference indicia (104) and the one of the first (100) and second (102) reference indicia having the same primary adjective as the third element in response to the scanning processor detecting the occurrence of the common noun (part) preceded solely by the primary adjective of the third element.

Finally, the second embodiment of the computer system includes a common noun processor for automatically inserting 172 the first (100), second (102) and third (104) reference indicia following the common noun (part) in response to the scanning processor detecting the occurrence of the common noun (part) unmodified by an adjective 174 without attaching the first (100) and second (102) and third (104) reference indicia to occurrences of the common noun modified by one of the adjectives.

A third embodiment of the computer system includes a first element memory for storing 222 a first element designated by a common noun (part) preceded by a first primary adjective (red) and a first secondary adjective (top) and for storing 224 a first reference indicia (100) associated with the first element.

The third embodiment of the computer system also includes a second element memory for storing 226 a second element designated by the common noun (part) preceded by a second primary adjective (blue) and a second secondary adjective (bottom) and for storing 228 a second reference indicia (102) associated with the second element.

The third embodiment of the computer system also includes a third element memory for storing 230 a third element designated by the common noun (part) preceded by the first primary adjective (red) and a second secondary adjective (bottom) and for storing 232 a third element reference indicia (104) associated with the third element.

The third embodiment of the computer system also includes a fourth element memory for storing 234 a fourth element designated by the common noun (part) preceded by the second primary adjective (blue) and the first secondary adjective (bottom) and for storing 236 a fourth reference indicia (106) associated with the fourth element.

The computer system is characterized by a scanning processor for scanning the document memory for each occurrence of the common noun (part) processors for inserting the proper reference indicia in response to each occurrence of the common noun.

The third embodiment of the computer system includes a first element processor for automatically inserting 240 the first reference indicia (100) following the common noun (part) in response to the scanning processor detecting the occurrence of the common noun (part) preceded by the first primary adjective (red) and the first secondary adjective (top) 242. The system further includes a second element processor for automatically inserting 244 the second reference indicia (102) following the common noun (part) in response to the scanning processor detecting the occurrence of the common noun (part) preceded by the second primary adjective (blue) and the second secondary adjective (bottom) 246. The system further includes a third element processor for automatically inserting 248 the third reference indicia (104) following the common noun (part) in response to the scanning processor detecting the occurrence of the common noun (part) preceded by the first primary adjective (red) and the second secondary adjective (bottom) 250. The system further includes a fourth element processor for automatically inserting 252 the fourth reference indicia (106) following the common noun (part) in response to the scanning processor detecting the occurrence of the common noun (part) preceded by the second primary adjective (blue) and the first secondary adjective (top) 254.

The third embodiment of the computer system further includes processors for inserting more than one reference indicia when a common noun (part) is modified by a single adjective. The system includes a first secondary adjective processor for automatically inserting 256 the first (100) and fourth (106) reference indicia following the common noun (part) in response to the scanning processor detecting the occurrence of the common noun (part) preceded solely by the first secondary adjective (top) 258. The system includes a second secondary adjective processor for automatically inserting 260 the second (102) and third (104) reference indicia following the common noun (part) in response to the scanning processor detecting the occurrence of the common noun (part) preceded solely by the second secondary adjective (bottom) 262. The system includes a first primary adjective processor for automatically inserting 264 the first (100) and third (104) reference indicia following the common noun (part) in response to the scanning processor detecting the occurrence of the common noun (part) preceded solely by the first primary adjective (red) 266. The system includes a second primary adjective processor for automatically inserting 268 the second (102) and fourth (106) reference indicia following the common noun (part) in response to the scanning processor detecting the occurrence of the common noun (part) preceded solely by the second primary adjective (blue) 270.

Finally, the third embodiment of the computer system includes a common noun processor for automatically inserting 272 the first (100), second (102), third (104) and fourth (106) reference indicia following the common noun (part) in response to the scanning processor detecting the occurrence of the common noun (part) unmodified by an adjective 274 without attaching the first (100) and second (102) and third (104) and fourth (106) reference indicia to occurrences of the common noun modified by one of the adjectives.

Obviously, many modifications and variations of the present invention are possible in light of the above teachings and may be practiced otherwise than as specifically described while within the scope of the appended claims. That which is prior art in the claims precedes the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. A method of using a computer having a memory and a processor to prepare a document referencing elements to a drawing and presented in the document with a common noun and further differentially presented with different adjectives identifying the noun in the document, said method comprising the steps of:
   manually designating (22) a first element with a common noun preceded by a first primary adjective,
   associating (24) a first reference indicia with the common noun preceded by the first primary adjective to reference the first element,
   storing in the computer memory the first reference indicia with the common noun preceded by the first primary adjective,
   manually designating (26) a second element with the common noun preceded by a second primary adjective, associating (28) a second reference indicia with the common noun preceded by the second primary adjective to reference the second element, storing in the computer memory the second reference indicia with the common noun preceded by the second primary adjective, scanning (38) the document with the computer for each occurrence of the common noun, inserting (40) the first reference indicia following the common noun in response to the scanning and each recitation of the common noun preceded by the first primary adjective (42) to reference the first element throughout the document, inserting (44) the second reference indicia following the common noun in response to the scanning and each recitation of the common noun preceded by the second primary adjective (46) to reference the second element throughout the document, and characterized by the computer automatically inserting (72) the first and second reference indicia following the common noun in response to the scanning and each recitation of the common noun unmodified by an adjective (74) to reference the unmodified common noun with both reference indicia for the first and second elements throughout the document without attaching the first and second reference indicia to occurrences of the common noun modified by one of the adjectives.

2. A method as set forth in claim 1 further comprising the steps of:

manually designating (122, 222) the first element by adding a first secondary adjective to the common noun preceded by the first primary adjective, storing in the computer memory the designated first element with the common noun preceded by a first primary adjective and a first secondary adjective, manually designating (126, 226) the second element by adding a second secondary adjective to the common noun preceded by the second primary adjective, storing in the computer memory the designated second element with the common noun preceded by a second primary adjective and a second secondary adjective, automatically inserting (140, 240) the first reference indicia following the common noun in response to the scanning and each recitation of the common noun modified by the first primary adjective and the first secondary adjective (142, 242) to reference the common noun with the first reference indicia for the first element throughout the document, and automatically inserting (144, 244) the second reference indicia following the common noun in response to the scanning and each recitation of the common noun modified by the second primary adjective and the second secondary adjective to reference the common noun with the second reference indicia for the second element throughout the document (146, 246).

3. A method as set forth in claim 2 further comprising the steps of:

manually designating (130, 230) a third element with the common noun preceded by a third combination of adjectives including one of the primary adjectives identifying one of the first and second elements combined with the secondary adjective identifying the other one of the first and second elements, associating (132, 232) a third reference indicia with the common noun preceded by the third combination of adjectives, storing in the computer memory the designated third element with the common noun preceded by the third combination of adjectives, automatically inserting (148, 248) the third reference indicia following the common noun in response to the scanning and each recitation of the common noun preceded solely by the third combination of adjectives (150, 250) to reference the third element with the common noun preceded by the third combination of adjectives throughout the document, and further characterized by the computer automatically inserting (166, 264) the first and third reference indicia following the common noun in response to the scanning and each recitation of the common noun modified solely by the one of the primary and secondary adjective shared between the first and third elements (166, 266) and automatically inserting (160, 260) the second and third reference indicia following the common noun in response to each recitation of the common noun modified solely by the one of the primary and secondary adjectives shared between the second and third elements (162, 262), and automatically inserting (172) the first reference indicia and the second reference indicia and the third reference indicia following the common noun in response to the scanning and each recitation of the common noun unmodified by an adjective (174) to reference the first element and the second element and the third element throughout the document without attaching the first and second and third reference indicia to occurrences of the common noun modified by one of the adjectives.

4. A method as set forth in claim 3 further comprising the steps of:

manually designating a fourth element (234) with the common noun preceded by a fourth combination including the other primary adjective from the primary adjective of the third combination combined with the other secondary adjective from the secondary adjective of the third combination, associating (236) a fourth reference indicia with the common noun preceded by the fourth combination of adjectives to reference the fourth element, storing in the computer memory the designated fourth element with the common noun preceded by the fourth combination of adjectives automatically (252) inserting the fourth reference indicia following the common noun in response to the scanning and each recitation of the common noun preceded by the fourth combination of adjectives (254) to reference the fourth element throughout the document, further characterized by the computer automatically inserting (256) the first and fourth reference indicia following the common noun in response to the scanning and each recitation of the common noun modified solely by the one of the primary and secondary adjective shared between the first and fourth elements (258) and automatically inserting (268) the second and fourth reference indicia following the common noun in response to the scanning and each recitation of the common noun modified solely by the one of the primary and secondary adjectives shared between the second and fourth reference indicia (270), and automatically inserting (272) the first reference indicia and the second reference indicia and the third reference indicia and the fourth reference indicia following the common noun in response to the scanning and each recitation of the common noun unmodified by an adjective (274) to reference the common noun with the reference indicia for the first element and the second element and the third element and the fourth element throughout the document without attaching the first and second and third and fourth reference indicia to occurrences of the common noun modified by one of the adjectives.

5. A method of using a computer having a memory and a processor to prepare a document referencing elements to a drawing and presented in the document with a common noun and further differentially presented with different adjectives identifying the noun in the document, said method comprising the steps of:

manually designating (22, 122, 222) a first element with a common noun preceded by a first primary adjective and a first secondary adjective, associating (24, 124, 224) a first reference indicia with the common noun preceded by the first primary adjective and the first secondary adjective to reference the first element, storing in the computer memory the first reference indicia with the common noun preceded by the first primary adjective and the first secondary adjective manually designating (26, 126, 226) a second element with a common noun preceded by a second primary adjective and a second secondary adjective, associating (28, 128, 228) a second reference indicia with the common noun preceded by the second primary adjective and the second secondary adjective to reference the second element, storing in the computer memory the second reference indicia with the common noun preceded by the second primary adjective and the second secondary adjective, manually designating (130, 230) a third element with the common noun preceded by the first primary adjective and the second secondary adjective, associating (132, 232) a third reference indicia with the common noun preceded by the first primary adjective and the second secondary adjective to reference the third element, storing in the computer memory the third reference indicia with the common noun preceded by the first primary adjective and the second secondary adjective, manually designating (234) a fourth element with the common noun preceded by the second primary adjective and the first secondary adjective, associating (236) a fourth reference indicia with the common noun preceded by the second primary adjective and the first secondary adjective to reference the fourth element, storing in the computer memory the fourth reference indicia with the common noun preceded by the second primary adjective and the first secondary adjective, scanning (38, 138, 238) the document with the computer for each occurrence of the common noun, automatically inserting (40, 140, 240) the first reference indicia following the common noun in response to the scanning and each recitation of the common noun preceded by the first primary adjective and the first secondary adjective (42, 142, 242) throughout the document to reference the first element, automatically inserting (44, 144, 244) the second reference indicia following the common noun in response to the scanning and each recitation of the common noun preceded by the second primary adjective and the second secondary adjective (46, 146, 246) throughout the document to reference the second element, automatically inserting (148, 248) the third reference indicia following the common noun in response to the scanning and each recitation of the common noun preceded by the first primary adjective and the second secondary adjective (150, 250) throughout the document to reference the third element, automatically inserting (252) the fourth reference indicia following the common noun in response to the scanning and each recitation of the common noun preceded by the second primary adjective and the first secondary adjective (254) throughout the document to reference the fourth element, characterized by automatically inserting (256) the first and fourth reference indicia following the common noun in response to the scanning and each recitation of the common noun modified solely by the first secondary adjective (258) throughout the document to reference the first and fourth elements, automatically inserting (160, 260) the second and third reference indicia following the common noun in response to the scanning and each recitation of the common noun modified solely by the second secondary adjective (162, 262) throughout the document to reference the second and third elements, automatically inserting (164, 264) the first and third reference indicia following the common noun in response to the scanning and each recitation of the common noun modified solely by the first primary adjective (166, 266) throughout the document to reference the first and third elements, automatically inserting (268) the second and fourth reference indicia following the common noun in response to the scanning and each recitation of the common noun modified solely by the second primary adjective (270) throughout the document to reference the second and fourth elements, and automatically inserting (172, 272) the first reference indicia and the second reference indicia and the third reference indicia and the fourth reference indicia following the common noun in response to the scanning and each recitation of the common noun unmodified by an adjective (174, 274) throughout the document to reference the unmodified common noun with all reference indicia for the first element and the second element and the third element and the fourth element without attaching the first and second and third and fourth reference indicia to occurrences of the common noun modified by one of the adjectives.

\* \* \* \* \*